Dec. 18, 1934.   H. D. MATTHEWS   1,985,181
BIMETALLIC ELEMENT
Filed July 9, 1934
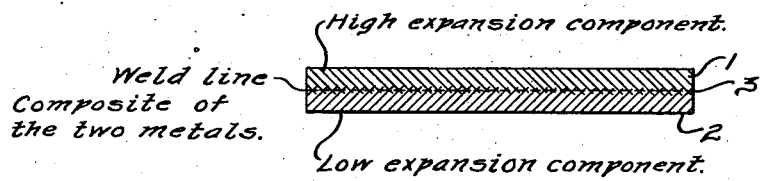
INVENTOR.
Howard D. Matthews.
BY
ATTORNEY.

Patented Dec. 18, 1934

1,985,181

UNITED STATES PATENT OFFICE 1,985,181

BIMETALLIC ELEMENT

Howard D. Matthews, Detroit, Mich., assignor to W. M. Chace Valve Company, Detroit, Mich., a corporation of Michigan Application July 9, 1934, Serial No. 734,285

7 Claims. (Cl. 297—15)

This invention relates to bimetallic elements or blades for utilization as a thermostat in which the two elements forming the blade are nickel-steel alloys of different coefficients of expansion and an object of this invention is to provide a bimetallic blade of such composition of the two elements that one may be directly welded to the other to form a blade of non-separable elements under heat as high as 1200 degrees Fahrenheit.

Heretofore, it has been quite commonly the practice to weld two strips forming a bimetallic blade by means of an interposed metal such as copper, the melting point of which is below that of either component of the blade and thus a weld is secured that, under high temperature, tends to separate and further the interposed metal binder affects the activity of the blade under temperature change. Furthermore, where such strips as heretofore more generally in use are concerned, an inefficient weld is attained where the two metals are directly united by raising the temperature to such degree that the metal is practically at the melting point. I have discovered that the cause of an imperfect weld under this latter condition is due to too high carbon content in one element compared to the other which lowers its melting point. This tends to cause the same to burn at the welding temperature of said other element, thereby preventing a proper merging of the metals at the welding line. As this burning of the metal carries through the entire thickness of the high expansion alloy, fractures occur in the subsequent rolling and this prohibits commercial use even though the two metals do not completely separate at the welding line.

An object of the invention is to obviate these various difficulties and to secure a non-separable weld between two nickel-steel alloys in the making of a thermostat of the reversible type and comparatively high activity at certain temperatures—namely, from minus 50 degrees to plus 700 degrees F. above which the activity of the bimetal element is practically uniform.

The low side in most bimetallic elements contains nickel within a range of from 36 to 42 per cent. This has been so well established in the prior art as to be a common composition. For the high side it is very desirable to secure a composition having a coefficient of expansion of approximately .0000115 per one degree F. which is approximately the expansion coefficient of brass which has an average value of .0000110 per one degree F. from 20 degrees to 100 degrees C. As brass cannot be utilized at high temperatures, due to reaching its limit of elasticity at about 400 degrees F., it is of no value for use as the high side of a bimetallic thermometer operating under higher temperature.

While the low side of a bimetallic blade has been made of nickel-steel alloy having from 36 to 42 per cent nickel content, I find that the best results in securing a proper weld wherein the merging of the two elements is uniform at the line of weld is attained when both the low and the high side have a carbon content not to exceed .25 per cent, and it is therefore an object of the invention to provide a bimetallic element, both blades being formed of a nickel-steel alloy having a carbon content below that resulting in a burning between the grains of the metal when the alloys are brought to welding temperature.

As is above stated, it is well known to provide a copper binder between the two nickel-steel alloys in order to weld the same together in which case the temperature is below the melting point of the two nickel-steel alloys. Recourse has also been had to form a nickel-steel alloy containing a percentage of copper as is the case in the bimetallic couple described in the U. S. patent to W. M. Chace, No. 1,642,485. The high expansion side herein described particularly distinguishes from such previous composition in that I have been able to secure a weld with the absence of copper either as a component of one or other elements of the blade or as an interposed element between the two and thus have secured a more active high expansion side and of longer life in use under high temperature which would tend to soften the copper when used as an interposed element. The composition on the low side is practically restricted to nickel and iron with a specified carbon content and on the high side to nickel and chromium with iron of a specified carbon content.

These objects and novel features are attained by a bimetallic blade formed of my new composition as hereinafter more fully described and claimed.

The drawing is an enlarged sectional view of two welded nickel-steel alloys or different thermal characteristics.

It is first to be understood that the two compositions for the respective low and high sides are usually first made in sheet or strip form of a greater thickness than is required in the finished blade. The two elements of the specific composition hereinafter given are usually of the same thickness and are placed face to face with a flux therebetween and then submitted to welding temperature while in pressure contact. As these elements approach the melting point, the two metals at the line of contact merge and form a composite of two metals. This is shown in the drawing in which the high expansion component is indicated at 1 and the low expansion component 2 and the line of the weld indicated by the dotted line 3. The cross-hatching lines of the two elements is shown as overlapping at the center to indicate the central portion of the completed blade as being a composite of the two metals. Subsequent to welding the two parts together, they are submitted to a hot rolling operation wherein the blade is reduced to the desired thinness and thereafter cut into the desired form as required for various uses as a thermostatic element and finally heat treated to relieve the blade of internal stress developed in the forming operation.

The preferred composition for the low side is as follows:

|  | Per cent |
|---|---|
| Nickel content | 36 to 42 |
| Carbon content | .10 to .25 |
| Balance, practically pure iron | |

The most satisfactory composition for the high side is as follows:

|  | Per cent |
|---|---|
| Carbon | .15 |
| Silicon | .80 |
| Manganese | .43 |
| Nickel | 22.15 |
| Chromium | 3.00 |
| Substantially pure iron | 73.47 |

The low side may vary in its nickel content within the range indicated and the carbon content may vary from .10 to .25 per cent. The high expansion side for use in a reversible type of bimetallic couple may have a carbon content ranging from .10 to .25 per cent, a nickel content ranging from 20 to 24 per cent, and a chromium content of about 5 per cent when the least amount of nickel is used to about 2½ per cent when the greatest amount of nickel is used. However, the most active high side is approximately as given in the above complete analysis.

It is pointed out that the silicon content in the above analysis is not critical and the manganese content is held practically constant but the nickel content should be kept within the range of from 20 to 25 per cent and the chromium content within the range of from 5 to 2½ per cent in order to maintain a satisfactorily high coefficient of expansion.

It will be realized from the foregoing description that an efficient bimetallic element of two nickel-steel alloys of different thermal characteristics may be formed by directly welding the one to the other through surface contact under pressure thereby providing a weld which is a composite of the two alloys. This provides a comparatively thin alloy between the two elements of the blade whose coefficient of expansion is between the coefficients of expansion of the high and the low side and thus is productive of a structure capable of more perfect calibration than has heretofore been usual in that the activity of the blade is solely the result of the effect of the high expansion element on the low expansion side through the integral relationship of the two elements by the composite weld. It is also to be observed that in the securing of this integral relationship, the carbon content of each element must not materially exceed .25 per cent in order to secure the proper weld and that to secure an inflection point at about 500 degrees F., the low side should contain about 36 per cent nickel while with 42 per cent nickel low side, the inflection point will be at about 700 degrees F. The blade formed of the two specified nickel alloys as described is fully as active as the well known invar-brass couple but is adapted for use at much higher temperatures than such invar-brass couple without injury. When heat treated to relieve the metal of internal or molecular stress developed thereby by the forming operation, the device will be uniform in its action throughout a long period of time although repeatedly subjected to high and low temperatures and thus the principal objects of the invention are attained by the compositions described.

It is pointed out that the percentages of the elements of both the low and the high side of the bimetallic element may be varied somewhat from the specific percentages stated without materially affecting the character of the bimetallic element or departing from the spirit and scope of the invention as set forth in the appended claims.

Having thus briefly described my invention, what I claim and desire to secure by Letters Patent of the United States is—

1. A bimetallic element consisting of two nickel-steel alloys of dissimilar thermal characteristics welded together, the alloy of low coefficient of expansion containing approximately 36 to 42 per cent nickel and a carbon content not greater than .25 per cent and the metal of higher coefficient of expansion having a nickel content within the range of 20 to 25 per cent, a chromium content inversely varying in respect thereto of from approximately 5 to 2½ per cent, and a carbon content not greater than .25 per cent.

2. A bimetallic element consisting of two nickel-steel alloys of dissimilar thermal characteristics welded directly one to the other to act as a unitary structure in response to temperature change, both said members containing carbon within the range of approximately .10 to .25 per cent varied to produce melting points of substantially the same temperature in the respective members.

3. A bimetallic element having as one of its members a nickel-steel alloy in which the nickel content is not greater than 42 per cent and the carbon content not greater than .25 per cent to which is directly welded through surface contact under pressure at a temperature approximating the melting point thereof, an element of approximately the same melting point temperature and substantially of the following composition:

|  | Per cent |
|---|---|
| Carbon | .15 |
| Silicon | .80 |
| Manganese | .43 |
| Nickel | 22.15 |
| Chromium | 3.00 |
| Substantially pure iron | 73.47 |

4. A bimetallic element consisting of two nickel-steel alloys of different thermal characteristics, the element of higher coefficient of expansion being a metal of substantially the following composition:

|  | Per cent |
|---|---|
| Carbon | .15 |
| Silicon | .80 |
| Manganese | .43 |
| Nickel | 22.15 |
| Chromium | 3.00 |
| Substantially pure iron | 73.47 |

5. A bimetallic element consisting of an element of low coefficient of expansion and an element of high coefficient of expansion directly welded thereto having substantially the following composition:

| | Per cent |
|---|---|
| Nickel | 22.00 |
| Chromium | 3.00 | and the balance, pure iron containing not more than .25 per cent carbon, the melting point of the element of the lower coefficient of expansion being approximately the same as that of the element of higher coefficient of expansion.

6. A bimetallic element consisting of two nickel-steel alloys of dissimilar coefficients of expansion, the carbon content of each of which is not greater than .25 per cent and the melting point of which is practically the same whereby the two alloys may be welded together in surface contact under pressure by a weld that is a composite of the two alloys to form a unitary structure responsive to temperature change.

7. A bimetallic element consisting of a nickel-steel alloy having a low coefficient of expansion and a nickel-chromium alloy having a high coefficient of expansion, both said elements respectively having such carbon content that the melting point of the two elements is at substantially the same temperature whereby a direct weld may be made through surface contact of the two elements under pressure without burning or fracture thereby providing a bimetallic element of a high activity and free from internal fracture or separation along the welding line adaptable for use under high temperature.

HOWARD D. MATTHEWS.